Figure 2:
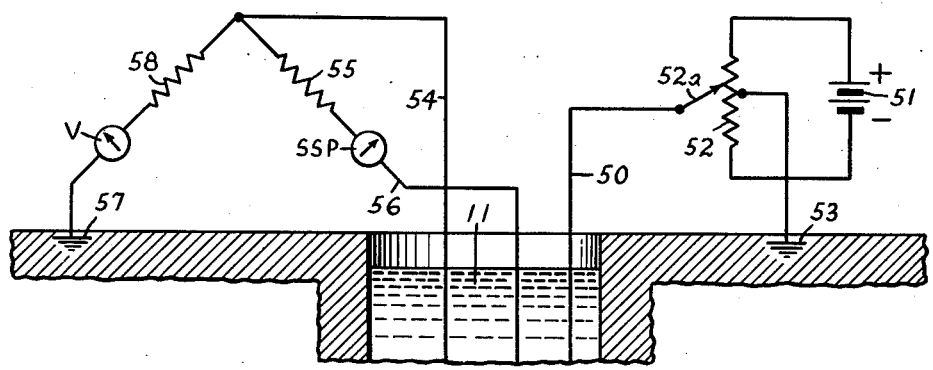
Figure 2:
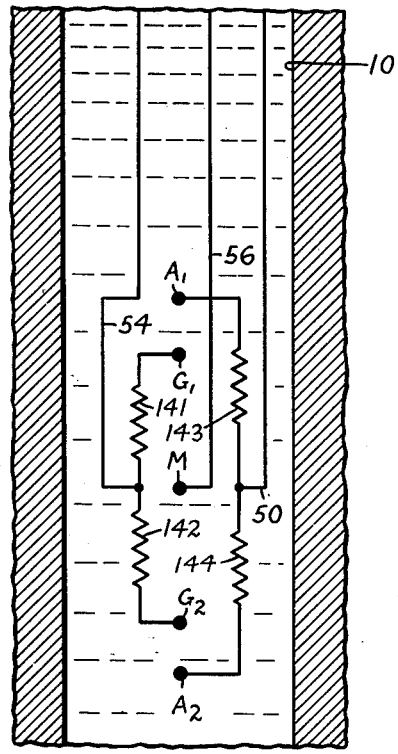

Nov. 12, 1957  HENRI-GEORGES DOLL  2,813,249
WELL LOGGING APPARATUS
Filed June 10, 1953  2 Sheets-Sheet 1
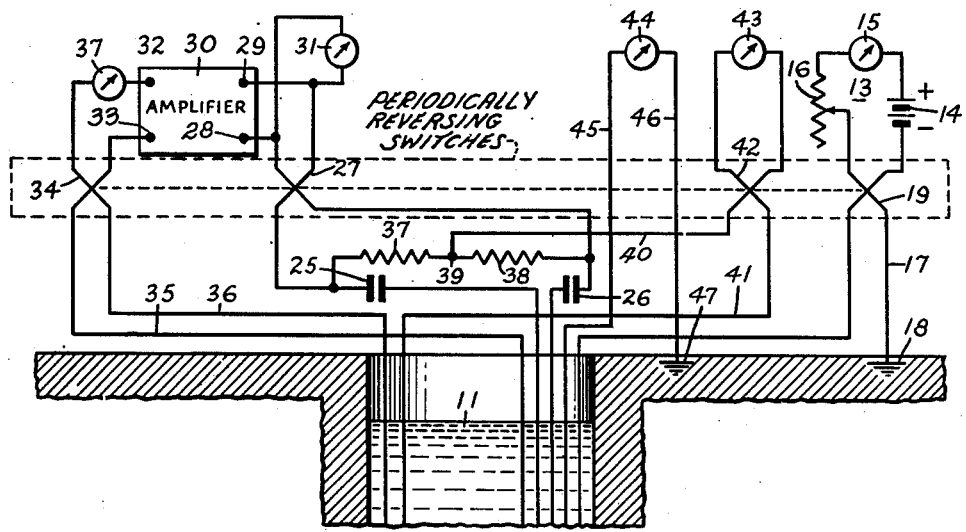
FIG.1.
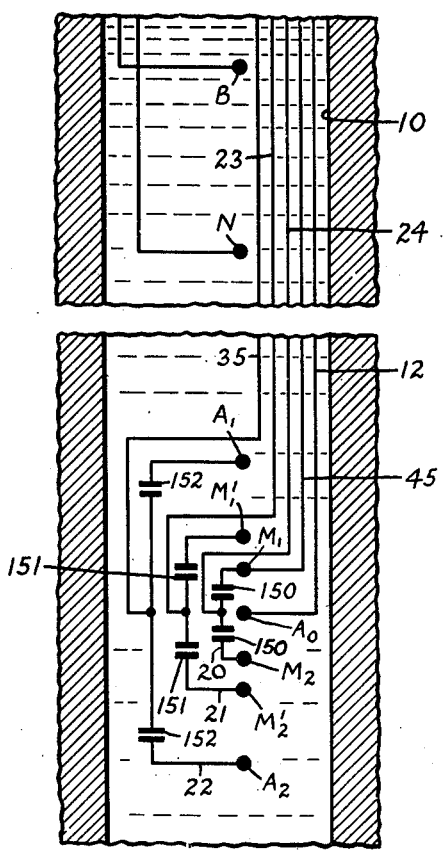
INVENTOR.
HENRI-GEORGES DOLL
BY
Campbell, Brumbaugh, Free & Graves
HIS ATTORNEYS.

Nov. 12, 1957   HENRI-GEORGES DOLL   2,813,249
WELL LOGGING APPARATUS
Filed June 10, 1953   2 Sheets-Sheet 2

INVENTOR.
HENRI-GEORGES DOLL
BY
HIS ATTORNEYS.

United States Patent Office 2,813,249
Patented Nov. 12, 1957

2,813,249

WELL LOGGING APPARATUS

Henri-Georges Doll, Ridgefield, Conn., assignor, by mesne assignments, to Schlumberger Well Surveying Corporation, Houston, Tex., a corporation of Texas Application June 10, 1953, Serial No. 360,739

6 Claims. (Cl. 324—1)

The present invention relates to apparatus for making electrical logs in wells and more particularly to new and improved electric circuits for obtaining electrical logs in wells drilled into the earth.

The copending application Serial No. 161,641, filed May 12, 1950, now U. S. Patent No. 2,712,627, issued July 5, 1955, in the name of Henri-Georges Doll, for "Electrical Resistivity Well Logging Method and Apparatus," of which the present application is a continuation-in-part, discloses highly effective electrical resistivity well logging systems utilizing focussing techniques for controlling the flow of current through earth formations surrounding a well. In general, such systems include one or more groups of electrodes, the electrodes in each group being connected together electrically and spaced apart longitudinally of the bore hole. In order to prevent possible disturbances to spontaneous potentials in the bore hole, of which it may be desired to obtain indications, it is there proposed to interpose between the electrically connected electrodes electrical impedance means capable of blocking D. C. while providing a low impedance path to the current used for making the electrical resistivity measurements.

Other electrical logging systems employing groups of interconnected electrodes are disclosed in the copending application Serial No. 60,872, filed November 19, 1948, now U. S. Patent No. 2,712,626, issued July 5, 1955, in the name of Henri-Georges Doll, for "Selective Spontaneous Potential Well Logging Method and Apparatus," of which the present application is also a continuation-in-part. This copending application also proposes to interpose impedance means between the electrodes comprising a group to control the symmetry of the device, i. e., to compensate for asymmetry in the electrode array resulting from either the spatial disposition of the electrodes or differences in their electrical properties.

This application is addressed to those embodiments of the inventions disclosed in the aforementioned two copending applications which utilize impedance means between the electrodes in a group of interconnected electrodes in an electrical logging system to enable improved and more effective logs to be obtained.

For a better understanding of the invention, reference is made to the following detailed description of several representative embodiments, taken in conjunction with the accompanying drawings in which:

Fig. 1 illustrates a typical electrical logging system of the type shown in the above-mentioned copending application Serial No. 161,641 and embodying the invention; and Fig. 2 is a schematic diagram of apparatus similar to that disclosed in the copending application Serial No. 60,872 which incorporates the invention.

In Fig. 1 is shown a representative electrical logging system of the type shown in the aforementioned copending application Serial No. 161,641 embodying the invention. In this figure, the well logging system comprises a principal current electrode $A_0$ disposed in a bore hole 10 which contains a column of more or less conducting liquid 11 such as drilling mud, for example. The electrode $A_0$ is connected by a conductor 12 in a supporting cable (not shown) to a source of electrical energy 13 at the surface of the earth, the circuit being completed through a conductor 17 connected to ground 18 at the surface of the earth.

The electrical energy source 13 may comprise, for example, a battery 14 connected in series with a current indicating instrument 15 and a rheostat 16. Interposed between the source of electrical energy 13 and the conductors 12 and 17 is a conventional commutator 19 which serves to reverse the connections between the source 13 and the conductors 12 and 17 periodically in accordance with the usual well logging practice.

The bore hole 10 can effectively be plugged electrically at locations above and below the electrode $A_0$ that are defined by pairs of potential electrodes $M_1$ and $M_2$, and $M'_1$ and $M'_2$, respectively. The potential electrodes $M_1$ and $M_2$ are electrically connected together and are preferably located equal short distances on opposite sides of the principal current electrode $A_0$. In order to avoid possible disturbance to the spontaneous potentials in the bore hole, the electrodes $M_1$ and $M_2$ are connected together through an insulated conductor 20 and the condensers 150 which block the passage of D. C. while providing a low impedance path to the commutated current.

Similarly, the potential electrodes $M'_1$ and $M'_2$ are connected together through an insulated conductor 21 and the condensers 151 and are located equal greater distances on opposite sides of the principal current electrodes $A_0$.

The potential differences between the electrodes $M'_1$ and $M_1$ and $M'_2$ and $M_2$ are maintained substantially at zero according to the invention by emitting current from a pair of auxiliary current electrodes $A_1$ and $A_2$. The latter electrodes are connected together through an insulated conductor 22 and the condensers 152 and are located equal distances on opposite sides of the principal current electrode $A_0$, outside of the potential electrodes $M'_1$ and $M'_2$.

The potential electrodes $M'_1$, $M'_2$ and $M_1$, $M_2$ are connected by the conductors 23 and 24, respectively, in the supporting cable (not shown), through the D. C. blocking condensers 25 and 26, respectively, and a conventional commutator 27 to the input terminals 28 and 29, respectively, of a D. C. power amplifier 30 which is described in greater detail below. The condensers 25 and 26 prevent any direct currents that may be picked up by the electrodes $M'_1$, $M_1$, $M_2$ or $M'_2$ from passing to the input terminals of the amplifier 30.

The commutator 27 is driven in synchronism with the commutator 19 and it is so phased as to convert the periodically varying potentials picked up between adjacent electrodes $M'_1$, $M_1$ and $M'_2$, $M_2$ to direct current values which are fed to the input terminals 28 and 29 of the amplifier 30. A conventional millivolt meter 31 may be connected across the amplifier input terminals 28 and 29 so as to provide indications of the potential difference which is fed to the amplifier 30.

The output terminals 32 and 33 of the amplifier 30 are connected through another conventional commutator 34 to the conductors 35 and 36 which pass through the supporting cable (not shown) to the electrodes $A_1$, $A_2$ and $B$, respectively, the electrode $B$ being located a considerable distance above the other electrodes of the assembly in the bore hole. The commutator 34 is also driven in synchronism with the commutator 19 and it should be properly adjusted to insure that the currents emitted by the auxiliary current electrodes $A_1$ and $A_2$ will be correctly phased with respect to the current emitted by the principal electrode $A_0$.

The amplifier 30 is designed with ample transconductance to feed back sufficient current to the electrodes $A_1$ and $A_2$ to maintain the average of the potential differences between adjacent electrodes $M'_1$, $M_1$ and $M'_2$, $M_2$ substantially at zero. When the electrode system lies midway between the boundaries of a formation, each of these potential differences actually becomes negligible, and the bore hole is, in effect, plugged electrically. A conventional current indicating instrument 37 may be connected in series with the amplifier output terminal 32 for providing indications of the control current supplied to the auxiliary current electrodes $A_1$ and $A_2$ in the bore hole.

The electrical resistivities of the earth formations surrounding the bore hole 10 may be accurately logged by obtaining indications of potential differences between a point in the vicinity of either adjacent potential electrodes $M_1$, $M'_1$ or $M_2$, $M'_2$ and a reference point. In Fig. 1, a log is made of the average potential of the electrodes $M'_1$ and $M_1$ with respect to the potential of an electrode N located a considerable distance away from the other electrodes in the bore hole.

Instead of placing a potential electrode between the electrodes $M'_1$ and $M_1$ for this purpose, a pair of equal resistors 37 and 38 are connected in series across the conductors 23 and 24 at points between the condensers 25 and 26 and the commutator 27, and the potential values are taken off at the junction 39 between the resistors 37 and 38. To this end, the junction 39 and the electrode N are connected through the conductors 40 and 41, respectively, and through another conventional commutator 42 to a suitable indicating device 43 which is preferably a conventional recording galvanometer of the type commonly used in well logging operations. The commutator 42 is driven in synchronism with the commutator 19 and suitably phased so as to convert the periodically varying potential differences picked up to substantially continuous values.

In order to obtain simultaneous measurements of spontaneous potentials, a second recording galvanometer 44 is connected by the conductors 45 and 46 to the electrode $M_1$ and to ground 47 at the surface of the earth, respectively, so that the recording galvanometer 44 will record spontaneous potential differences between electrode $M_1$ in the bore hole and the ground 47. Desirably, conventional filter means should be connected between the conductor 45 and the ground 47 to keep periodically varying potentials picked up by the electrodes $M_1$ and $M_2$ out of the recording galvanometer 44.

In a practical case, the distances from the principal current electrode $A_0$ to points located halfway between adjacent electrodes $M_1$, $M'_1$ and $M_2$, $M'_2$ may be the same and approximately equal to the diameter of the bore hole 10. The distances between the principal current electrode $A_0$ and the auxiliary current electrodes $A_1$ and $A_2$ may also be equal and approximately two and one-half times the bore hole diameter. These electrode spacings have been found suitable for measuring the resistivities of sections of the formations greater than about twice the diameter of the bore hole in thickness.

The electrodes in the bore hole, particularly those used for picking up potentials, i. e., the electrodes $M'_1$, $M_1$, $M_2$ and $M'_2$ should be electrochemically stable in the conductive bore hole fluid 11 in order to prevent the occurrence of spurious potentials of a few millivolts in magnitude. Experience indicates that with care, the conventional lead electrodes usually employed in well logging operations are satisfactory for the purpose.

In operation, the current supplied from the source of electrical energy 13 to the principal current electrode $A_0$ is adjusted to a desired value and is preferably maintained constant during the logging operation, although this is not necessary. The electrode system is then lowered through the bore hole by the conventional winch and cable (not shown) customarily employed for this purpose. Any potential differences appearing between the electrodes $M'_1$ and $M_1$ or $M'_2$ and $M_2$ will cause the amplifier 30 to supply sufficient current to the auxiliary current electrodes $A_1$ and $A_2$ to reduce such potential differences substantially to zero. As a result, very thin formations can be accurately logged and the electrical resistivity indications obtained with the recording device 43 for thin formations are more accurate than those obtainable heretofore. Furthermore, the influence of a conductive mud column on the resistivity measurements becomes practically negligible.

Moreover, by virtue of the presence of the condensers 150, 151 and 152, the interconnected electrodes in the electrode assembly do not adversely affect the spontaneous potential distribution in the bore hole, so that the instrument 44 provides accurate indications of spontaneous potentials.

Fig. 2 illustrates an electrical logging system of the type disclosed in the aforementioned copending application Serial 60,872, embodying the invention. This figure shows an electrode array lowered into a bore hole 10 which usually contains conductive mud. The electrode array may comprise, for example, five electrodes $A_1$, $G_1$, M, $G_2$, and $A_2$, maintained at a constant separation. The electrodes $A_1$ and $A_2$ are connected through an insulated conductor 50 to any suitable power source 51 by means of a potentiometer 52. This circuit, which will be called the power circuit hereinafter, is connected to ground at point 53.

In the vicinity of the electrodes $A_1$ and $A_2$ are placed two electrodes $G_1$ and $G_2$ which are connected to an insulated wire 54 and through a resistance 55 to a meter SSP. The other terminal of the meter SSP is connected to another electrode M, through an insulated wire 56. This circuit will hereinafter be called the measuring circuit.

It will also be noted that a meter V is connected to the electrodes $G_1$ and $G_2$ and to a ground electrode 57, through a resistance 58. This part of the circuit will hereinafter be called the control circuit.

The electrode M is situated intermediate the electrodes $G_1$ and $G_2$, while the electrodes $A_1$ and $A_2$ are usually located outside the $G_1$ and $G_2$ electrodes from the electrode M, rather than inside. It is convenient, though not necessary, to use a symmetrical arrangement of these five electrodes, with the electrode M at the center point. In a practical arrangement, the separation distance between the electrodes $G_1$ and $G_2$ may be about eight times the usual bore hole diameter, while the electrodes $A_1$ and $A_2$ may be separated from the corresponding electrodes $G_1$ and $G_2$, respectively, by a distance approximately equal to the radius of the bore hole. However, these distances may be modified appreciably within the scope of this invention.

According to the invention, impedances such as resistances, for example, are inserted either between each of the electrodes $G_1$, $G_2$ and the wire 54, or between each of the electrodes $A_1$, $A_2$ and the wire 50, or both, as shown in the figure. If the device is symmetrical with respect to the electrode M, the resistance 141 should preferably be made equal to the resistance 142, these resistances connecting the electrodes $G_1$ and $G_2$, respectively, to the insulated wire 54. However, if electrodes $G_1$ and $G_2$ are not identical, it may be that their resistances in the mud will be different. In such case, the differences may be compensated by giving different values to the resistances 141 and 142. Also, if the electrode device is not symmetrical, it may be found desirable to make the resistances 141 and 142 of different value in order to overcome the asymmetry of the device.

Similarly, the resistances 143 and 144, which are in series, respectively, with the electrodes $A_1$ and $A_2$ in Fig. 2, can be chosen of equal value, if the electrode device is symmetrical. In this manner, the introduction of resistances in series with the electrodes $A_1$ and $A_2$ will tend to insure that the current flowing in each electrode is of equal value. On the other hand, if there is asymmetry, either geometrical, or electrical such asymmetry can be compensated for by using different values for the resistances 143 and 144.

This group of five electrodes is adapted to be moved along the portion of an open bore hole which contains drilling mud or other conducting fluid. The electrodes are preferably of the impolarizable type; however, in the usual drilling muds, they can be conventional electrodes made of lead, such as are now used in electrical logging.

The power source 51 may comprise a battery or any other suitable source of D. C.; its terminals may be connected to a potentiometer 52 having a contact arm 52a that can be manipulated to vary the magnitude and polarity of the voltage applied between the electrodes $A_1$, $A_2$ and the ground 53. Obviously, any other suitable source of current may be used.

The resistance 55 and the SSP meter together constitute a high resistance millivoltmeter. As such, these two elements could be replaced by an electronic voltmeter, or other potential measuring device; preferably, it is adapted to record continuously while the electrode array is moved in the bore hole. Thereby the SSP meter provides a record of the potential difference appearing between the electrode M and the electrodes $G_1$ and $G_2$, which latter electrodes are connected in parallel by the resistors 141 and 142.

Similarly, the meter V and the resistance 58 comprise a high resistance millivoltmeter.

In operation, the potential of the electrodes $G_1$ and $G_2$ with respect to the reference electrode or ground 57, is maintained at a particular value while the SSP meter records a log as the electrode system is moved along the uncased bore hole. The operation of the logging system is outlined in detail and typical logs are shown in the above-noted copending application Serial No. 60,872, and it will not be necessary to elaborate upon those matters herein.

The invention thus provides novel and highly effective systems for making electrical logs in wells. By utilizing impedances to interconnect the longitudinally spaced apart electrodes in a group in systems of the types described above, desired conditions of operation may be readily achieved and improved logs may be obtained.

The specific embodiments described above are obviously susceptible of modification within the scope of the invention. For example, electrode connecting impedances of the type shown in Fig. 1 may be used in other electrical logging systems such as the several embodiments disclosed in the applicant's copending application Serial No. 161,641. Similarly, electrode connecting impedances like those shown in Fig. 2 are susceptible of use in other electrical logging systems of which the several modifications appearing in the applicant's copending application Serial No. 60,872 are representative. The invention, therefore, is not to be limited to the illustrative embodiments shown but its scope is defined in the following claims.

I claim:

1. In well logging apparatus, the combination of an electrode array adapted to be lowered into a bore hole, said electrode array comprising a central electrically conductive electrode element and a plurality of pairs of electrically conductive electrode elements symmetrically disposed on opposite sides of said central electrode element and spaced apart longitudinally of the bore hole, a first circuit having one end connected to a relatively remote reference point and having another end connected to the outer symmetrical pair of said electrode elements, a second circuit having two ends disposed in the vicinity of said electrode array, a first plurality of condenser means respectively connecting the electrode elements of a second symmetrical pair to one end of said second circuit, a second plurality of condenser means respectively connecting the electrode elements of a third symmetrical pair to the other end of said second circuit, said electrode elements of at least each of said second and third symmetrical pairs being interconnected only by their respective condenser means, a third circuit having one terminal connected to said central electrode element and another terminal adapted to be connected to a relatively remote reference point in an electrically conductive relation to said electrode array, a first source of alternating electrical energy responsive to signals in said second circuit for energizing said first circuit, a second source of alternating electrical energy in said third circuit, and electrical indicating means coupled to said second circuit.

2. In well logging apparatus, the combination of an electrode array adapted to be lowered into a bore hole, said electrode array comprising a central electrically conductive electrode element and a plurality of pairs of electrically conductive electrode elements symmetrically disposed on opposite sides of said central electrode element and spaced apart longitudinally of the bore hole, a first circuit having one end connected to a relatively remote reference point and having another end disposed in the vicinity of said electrode array, a first plurality of condenser means respectively connecting the electrodes in the outer symmetrical pair of said electrodes to said another end of said first circuit, a second circuit having two ends disposed in the vicinity of said electrode array, a second plurality of condenser means respectively connecting the electrode elements of a second symmetrical pair to one end of said circuit, a third plurality of condenser means respectively connecting the electrode elements of a third symmetrical pair to the other end of said second circuit, said electrode elements for each of said symmetrical pairs of said electrodes being interconnected only by their respective condenser means a first source of alternating electrical energy responsive to signals in said second circuit for energizing said first circuit, a third circuit having one terminal connected to said central electrode element and another terminal connected to a relatively remote reference point in electrically conductive relation to said electrical array, a second source of alternating electrical energy in said third circuit, electrical indicating means coupled to said second circuit, and means for providing indications of naturally occurring potentials between one of said electrode elements and a reference point.

3. In well logging apparatus, the combination of an electrode array adapted to be lowered into a bore hole, said array comprising a central electrically conductive electrode element and a plurality of pairs of electrically conductive electrode elements symmetrically disposed about said central electrode element and spaced apart longitudinally of the bore hole, a first tapped impedance means connecting the electrodes in the outer symmetrical pair, second tapped impedance means connecting the electrodes in a second symmetrical pair, a source of electrical energy having a terminal connected to a relatively remote reference point and another terminal connected to a tap on said first one of said impedance means, signal responsive means having a terminal connected to a reference point and another terminal connected to a tap on the other of said impedance means, and electrical indicating means connected to said tap on said other of said two tapped impedance means and to said central electrode element.

4. In well logging apparatus, the combination of an electrode array adapted to be lowered into a bore hole, said array including, a central electrode, first and second pairs of electrically connected electrodes each spaced above and below said central electrode, said second pair of electrodes being spaced outwardly of said first pair of electrodes, at least one impedance connected in series between the electrodes of at least one of said pairs of electrodes for limiting current flow therebetween, means for passing current between a remote current return point and one of two electrode means including (1) said central electrode and (2) said second pair of electrodes to produce an electric field, and means responsive to the potentials of said first pair of electrodes and the other of said two electrode means for producing a signal which is a function of said electric field.

5. In well logging apparatus, the combination of an electrode array adapted to be lowered into a bore hole, said array including a central electrode, first and second pairs of electrically connected electrodes each spaced above and below said central electrode, said second pair of electrodes being spaced outwardly of said first pair of electrodes, at least one impedance connected in series between the electrodes of at least one of said pairs of electrodes for limiting current flow therebetween, means for passing current between a remote current return point and one of two electrode means including (1) said central electrode and (2) said second pair of electrodes to produce an electric field, means responsive to the potentials of said first pair of electrodes and the other of said two electrode means for producing a signal which is a function of said electric field, and means for providing indications of naturally occurring potentials between one of said electrodes and a reference point.

6. In well logging apparatus, the combination of an electrode array adapted to be lowered into a bore hole, said array including a central electrode, first and second pairs of electrodes each spaced above and below said central electrode, said second pair of electrodes being spaced outwardly of said first pair of electrodes, at least one impedance connected in series between the electrodes of each of said pairs of electrodes for limiting current flow therebetween, means for passing current between a remote current return point and one of two electrode means including (1) said central electrode and (2) said second pair of electrodes to produce an electric field, and means responsive to the potentials of said first pair of electrodes and the other of said two electrode means for producing a signal which is a function of said electric field.

References Cited in the file of this patent

UNITED STATES PATENTS

| | | |
|---|---|---|
| 2,412,363 | Silverman | Dec. 10, 1946 |
| 2,446,303 | Owen | Aug. 3, 1948 |
| 2,592,125 | Doll | Apr. 8, 1952 |
| 2,712,627 | Doll | July 5, 1955 |